United States Patent
Pratt et al.

(10) Patent No.: US 8,804,045 B2
(45) Date of Patent: Aug. 12, 2014

(54) APPARATUS AND METHOD FOR REDUCING DISTORTION IN IMAGES

(75) Inventors: James Pratt, Round Rock, TX (US); Steven Belz, Cedar Park, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 12/961,951

(22) Filed: Dec. 7, 2010

(65) Prior Publication Data
US 2012/0140120 A1 Jun. 7, 2012

(51) Int. Cl.
| | |
|---|---|
| H04N 5/00 | (2011.01) |
| H04N 9/74 | (2006.01) |
| H04N 9/75 | (2006.01) |
| H04N 7/173 | (2011.01) |
| H04N 9/73 | (2006.01) |
| H04N 21/44 | (2011.01) |

(52) U.S. Cl.
CPC .......... *H04N 9/73* (2013.01); *H04N 21/44008* (2013.01)
USPC ............ 348/617; 725/131; 348/587; 348/592

(58) Field of Classification Search
USPC ........ 375/240.18, 240.24; 382/165, 167, 171, 382/195, 273, 274; 348/E05.007, 441, 448, 348/624, 625, 645, 630, 663, 668, 699, 700, 348/701; 345/581, 635; 386/52, E05.001
See application file for complete search history.

(56) References Cited

U.S. PATENT DOCUMENTS

| | | | | |
|---|---|---|---|---|
| 6,618,444 | B1 * | 9/2003 | Haskell et al. | 375/240.24 |
| 2006/0152634 | A1 * | 7/2006 | Yeh et al. | 348/701 |
| 2008/0232765 | A1 * | 9/2008 | Patten et al. | 386/52 |

OTHER PUBLICATIONS

"YouTube—Photoshop Removing flash hotspots: retouching" [Video]. Retrieved Nov. 18, 2010, from http://www.youtube.com/watch?v=I9CdEBIJ1PI&feature=player_embedded.

* cited by examiner

*Primary Examiner* — Nasser Goodarzi
*Assistant Examiner* — Adil Ocak
(74) *Attorney, Agent, or Firm* — Guntin & Gust, PLC; Jay H. Anderson

(57) ABSTRACT

A system that incorporates teachings of the present disclosure may include, for example, a set-top box having a processor operable to receive video content from a multimedia source, to detect at least one frame in the video content affected by a high intensity burst of light, and to determine a chrominance reference from frames in the video content unaffected by the high intensity burst of light. The processor is also operable to modify chrominance in the at least one frame according to the chrominance reference without altering spatial characteristics of objects in the at least one frame, to replace the at least one frame in the video content with the modified at least one frame to create updated video content, and to present the updated video content at a presentation device. Other embodiments are disclosed.

20 Claims, 5 Drawing Sheets

100

APPARATUS AND METHOD FOR REDUCING DISTORTION IN IMAGES

FIELD OF THE DISCLOSURE

The present disclosure relates generally to an apparatus and method for reducing distortion in images.

BACKGROUND

With the proliferation of media devices such as high definition camcorders in a small form factor and smart phones with a camera capable of recording video or still images, it has become common place for consumers to record their experiences anytime and at any location. In public places such as at sporting events and celebrations, it is common for recorded images to be distorted in part by flashes of light produced by cameras. Principally, recorded still or video images can be distorted by intense bursts of illumination from flash cameras.

DETAILED DESCRIPTION

The present disclosure describes, among other things, illustrative embodiments for reducing distortion in still image or video content caused by light bursts emanating from flash photography. Other embodiments are contemplated by the present disclosure.

One embodiment of the present disclosure includes a set-top box having a processor operable to receive video content from a multimedia source, to detect at least one frame in the video content affected by a high intensity burst of light, and to determine a chrominance reference from frames in the video content unaffected by the high intensity burst of light. The processor is also operable to modify chrominance in the at least one frame according to the chrominance reference without altering spatial characteristics of objects in the at least one frame, to replace the at least one frame in the video content with the modified at least one frame to create updated video content, and to present the updated video content at a presentation device.

One embodiment of the present disclosure includes a tangible computer-readable storage medium having computer instructions to determine a chrominance reference from frames in video content, and to detect at least one frame in the video content distorted at least in part by a burst of light. The tangible storage medium also includes computer instructions to modify chrominance in the at least one frame according to the chrominance reference without altering spatial characteristics of objects in the at least one frame, and to present updated video content at a presentation device, wherein the updated video content has the modified at least one frame.

One embodiment of the present disclosure includes a method for determining a chrominance reference from image frames in visual content, and for detecting at least one image frame in the visual content affected at least in part by a burst of luminance. The method can also involve modifying chrominance of the at least one image frame according to the chrominance reference and without altering spatial characteristics of objects in the at least one image frame, and presenting updated visual content at a presentation device having the modified at least one image frame.

Figure 1:
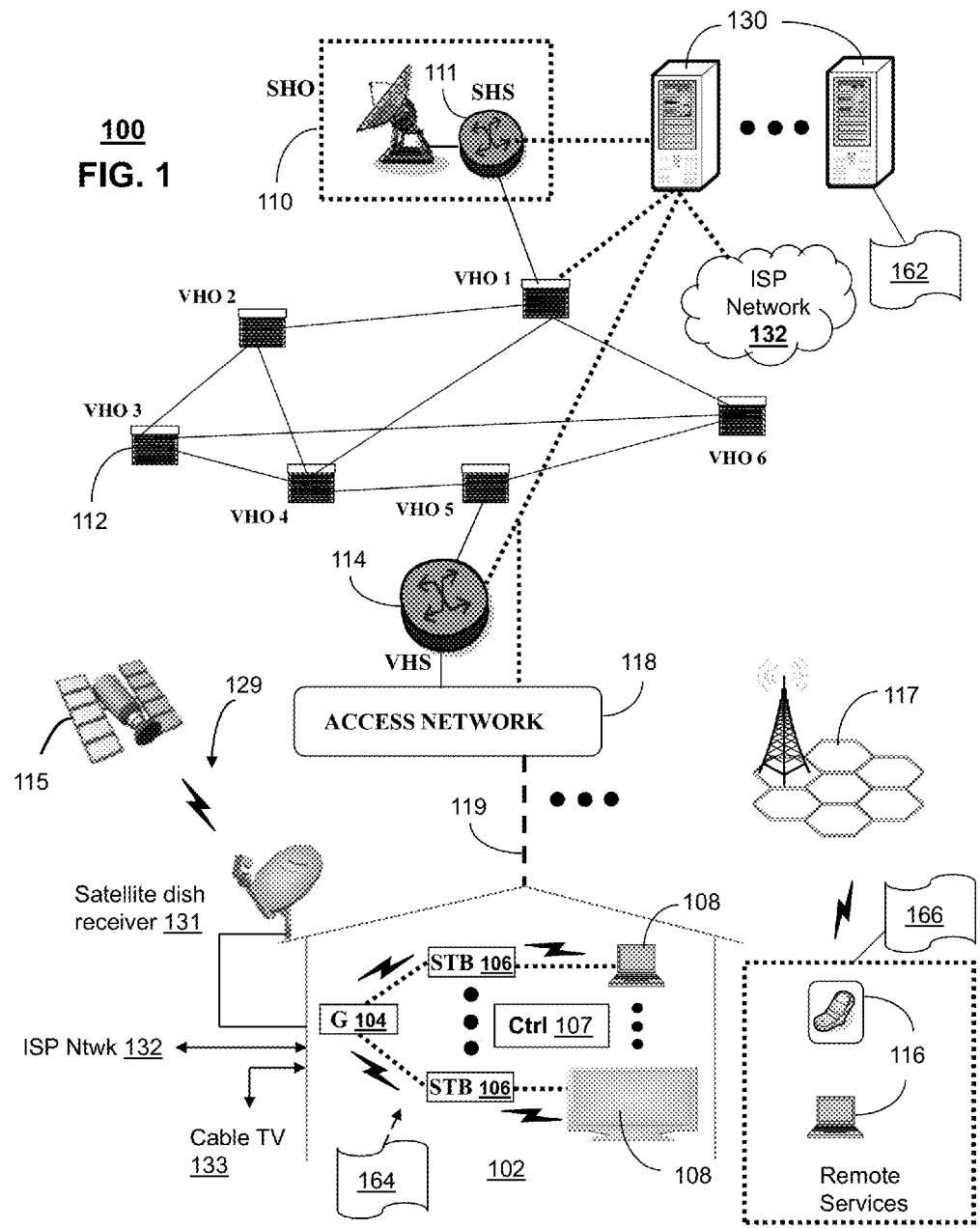
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

Communication system 100 can also provide for all or a portion of the computing devices 130 to function as a server or servers (herein referred to as server 130). The server 130 can use common computing and communication technology to perform function 162, which includes among things, a method for reducing or eliminating distortion in image content caused by flash photography was will be described below. Alternatively, or in combination, the STB 106 and/or the communication devices 116 can be adapted to perform functions 164 and 166, respectively, which can in whole or in part reduce or eliminate distortion in image produced by flash photography.

Illustrative embodiments of methods that can operate in portions of the devices of FIG. 1 are described below.

Figure 2:
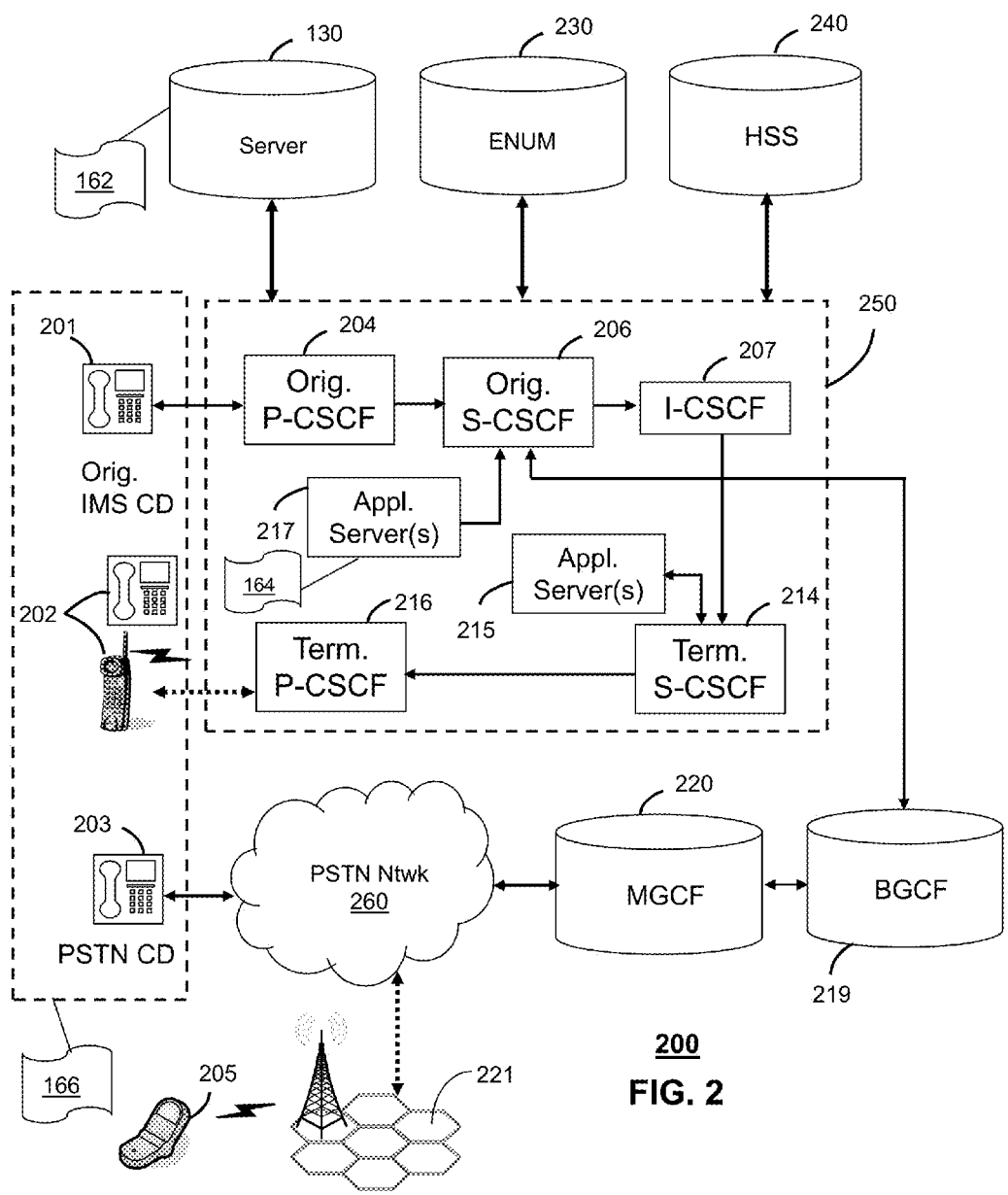

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding no answer, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant devices. In this embodiment, the cellular base station 221 may communicate directly with the IMS network 250.

The server 130 of FIG. 1 can be operably coupled to the second communication system 200 for purposes similar to those described above. It is further contemplated that the application servers 217 and CDs 201, 202 and 203 can perform functions 164 and 166, respectively, for purposes of reducing or eliminating distortion in image content caused by flash photography.

Illustrative embodiments of methods that can operate in portions of the devices of FIG. 2 are described below.

Figure 3:
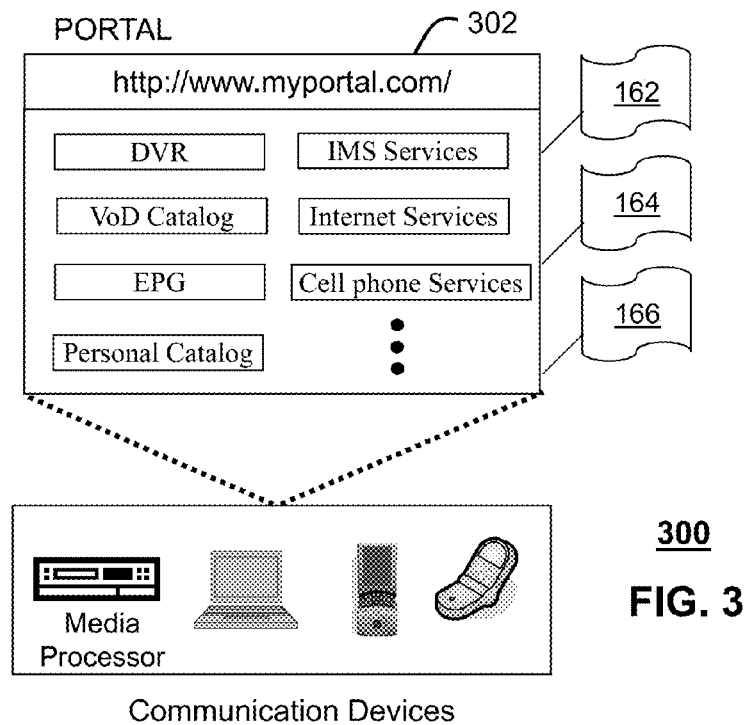
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166 of a server 130, STB 106, portable communication devices 116, application servers 217, and CDs 201, 202 and 203, respectively, as described earlier.

Illustrative embodiments of methods that can operate in portions of the web portal 302 of FIG. 3 are described below.

Figure 4:
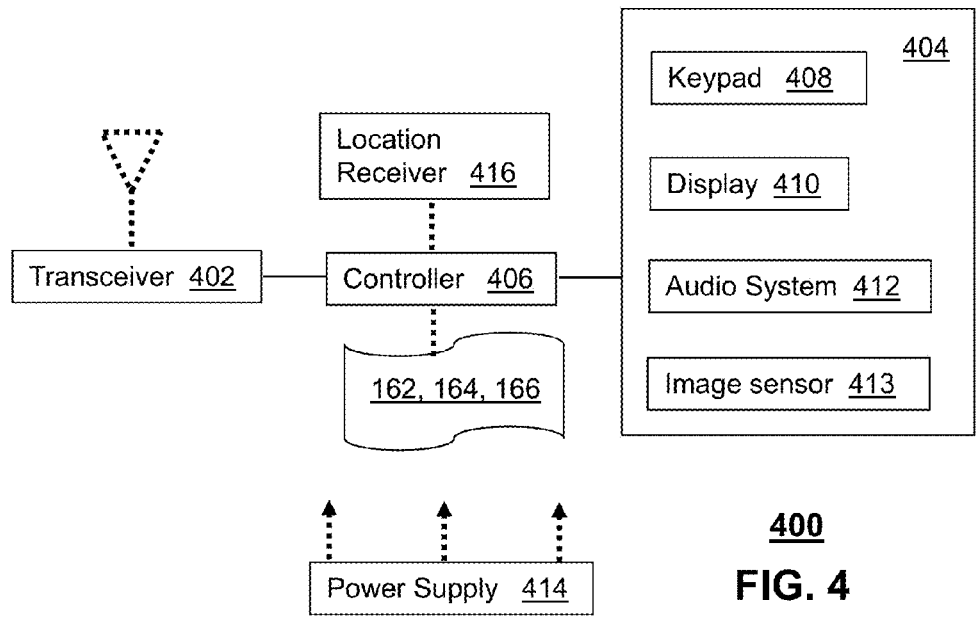
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/ EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the present disclosure that the communication device 400 can operate as any of the devices of FIGS. 1-3. It is further contemplated that the controller 406 can be adapted in various embodiments to perform functions 162, 164, 166 of server 130, STB 106, portable communication devices 116, application servers 217, and CDs 201, 202 and 203, respectively, as described earlier.

Illustrative embodiments of methods that can operate in portions of the communication device of FIG. 4 are described below.

Figure 5:
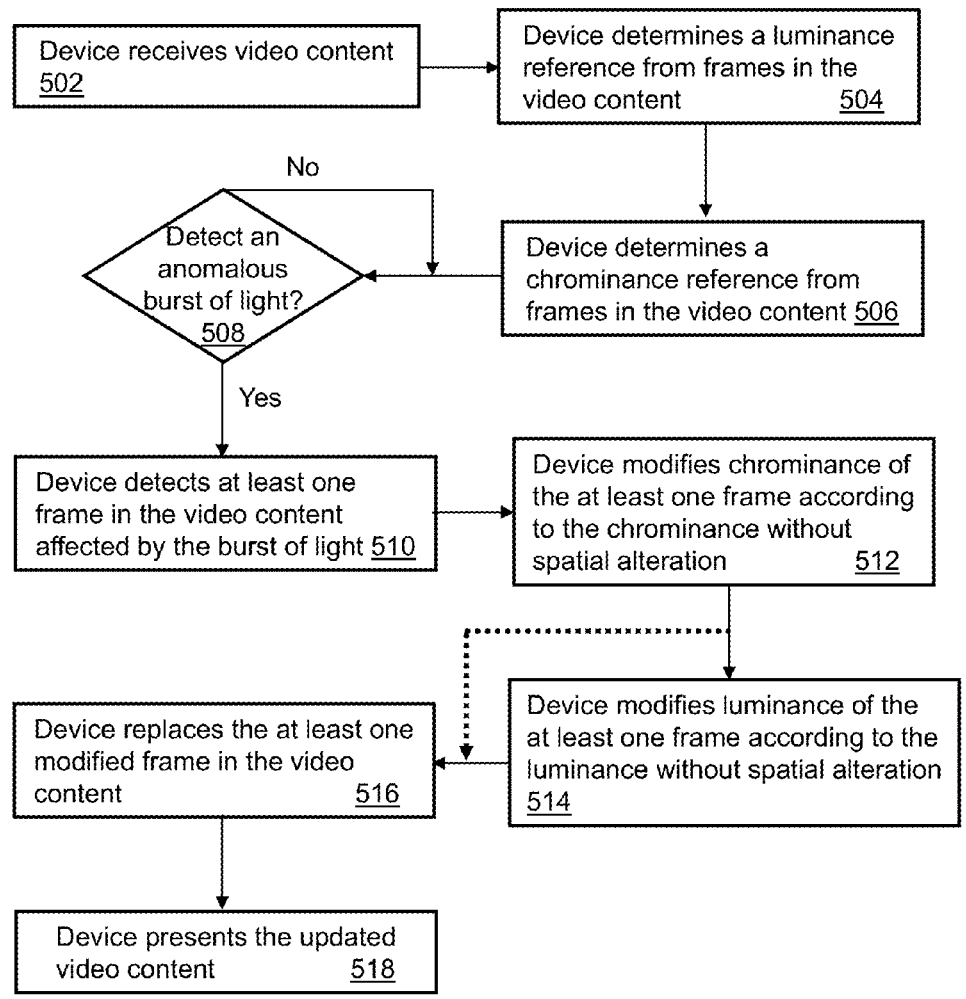
FIG. 5 depicts an illustrative embodiment of a method operating in portions of the systems described in FIGS. 1-4.

FIG. 5 depicts an illustrative method 500 that operates in portions of the devices of FIGS. 1-4. Method 500 can begin with step 502 in which a device such as server 130, STB 106, communication devices 116, application servers 217, or CDs 201, 202 or 203 receive video content from a multimedia source. For illustration purposes only, the STB 106 will be referred to in the steps that follow as the device referenced by flow diagram of FIG. 5. In this embodiment, the STB 106 would generally receive pre-recorded or live video content from the multimedia source. The multimedia source can be a network element of communication system 100, communication system 200, portal 302, or a device capable of recording still or video images (e.g., a camcorder, smart phone, etc.) that later submits the content to STB 106.

At step 504, the STB 106 can be adapted to determine a luminance reference from frames in the video content. The luminance reference can, for example, represent ambient light unaffected by flash photography. Generally, flash photography causes anomalous bursts of light having a short duration. With common image processing technology, a determination can be made from a sequence of frames in the video content whether bursts of light have occurred versus a steady luminance level detectable when flash photography is not present.

Step 504 can also be performed as a calibration step. For example, a user of a device (e.g., TV camera) that records or captures video content in real-time, can be directed to measure a luminance reference before an event begins that is likely to be affected by flash photography (e.g., a sports event, concert, etc.).

Based on the foregoing embodiment, the luminance reference can be determined while the event is being recorded, prior to the start of the event as a calibration step, or a combination thereof.

At step 506, the STB 106 can also be adapted to determine a chrominance reference. The chrominance reference can be determined from frames unaffected by flash photography. The STB 106 can be adapted, for example, to detect objects in the frames (e.g., human figures, background setting, etc.), and their respective measures of chrominance resulting in a collection of chrominance measurements which collectively constitute a chrominance reference. The chrominance measures of each object detected in the video frames can be based on a chrominance measure of pixels in each frame, or other suitable measures of chrominance for determining the chrominance reference for video frames unaffected (or substantially unaffected) by flash photography.

Alternatively, or in combination, a chrominance reference can also be determined from objects or portions of objects in video frames. In this embodiment, the frames may in part have luminance distortion in some portions, and not in others. Where it may be difficult to find complete frames with no distortion from flash photography, step 506 can be adapted to search for objects in the affected frames that have not been distorted (or substantially distorted) by bursts of light. For example, in celebrity events such as the Emmy's or Academy Awards, it is common for celebrities to be exposed to nearly continuous photography. In such circumstances, portions of the celebrities such as arms, hands and legs, may serve as a chrominance reference (e.g., color skin) which can be used to extrapolate chrominance for other body portions of the celebrity (e.g., face, neck, etc.). Additionally, the STB 106 can be adapted to recognize known celebrities (or objects) and search through a local or remote database for a chrominance reference of the detected celebrity (or object).

From the above illustrations, it should be evident that there are multiple embodiments for determining a chrominance reference of objects. The present disclosure therefore contemplates any present or next generation technique for measuring a chrominance reference of one or more objects detected in one or more image frames.

Referring back to FIG. 5, the STB 106 can be adapted in step 508 to detect in the video content received at step 508 anomalous bursts of light caused by flash photography. To provide sufficient time to detect and process video content, the STB 106 can be adapted to buffer the video content as it arrives, while steps 508 through 516 are performed by the STB 106. The luminance reference detected at step 504 can be used to detect the anomalous events at step 508. When, for example, the luminance in one or more frames exceeds the luminance reference in short durations (e.g., less than a second), the STB 106 can reasonably determine that flash photography has been detected. Other more sophisticated or complex luminance detection methods can be employed by the present disclosure for detecting flash photography. Present and next generation techniques for detecting flash photography in media content are contemplated by the present disclosure.

When the STB 106 detects at step 508 an anomalous event, it can proceed to step 510 where it detects the one or more frames affected by flash photography. In step 510, the STB 106 can be adapted to detect according to the luminance reference which objects have been affected by flash photography. In step 512, the STB 106 can modify the affected objects according the chrominance reference determined at step 506.

As noted earlier, the chrominance reference can comprise many measures or samplings of chrominance of objects. For instance, the chrominance reference can be measured from frames prior to and/or after the affected frames, where such frames have not experienced a substantial degree of distortion from flash photography. In this embodiment, the chrominance reference may be more useful since the frames prior to or after the affected frames may have a more accurate measure of chrominance of the objects captured in the affected frames than an overall chrominance reference applied uniformly to all frames. In one embodiment, step 506 can represent a continuous or repeatable measure of chrominance references which is determined in the vicinity of affected frames detected at steps 508 and 510 that are distorted by flash photography.

It is also noted that where video content is largely distorted by nearly continuous flash photography, a chrominance reference can be determined from portions of objects (e.g., arm, leg, neck) least distorted by flash photography, and/or by detecting known objects and retrieving a chrominance reference for the object.

The STB 106 can therefore have multiple options to choose from for a chrominance reference. Once a chrominance reference is chosen, the STB 106 can proceed to step 512 where it modifies the chrominance of objects in the affected frames according to the chrominance reference without spatial alteration. For example, suppose that a frame shows a person's profile distorted in part by excessive luminance caused by flash photography. The chrominance reference measured from previous or subsequent frames of the same object unaffected (or substantially unaffected) by flash photography can be used to modify the chrominance of the object in the affected frames. The same procedure can be applied to other objects detected with luminance that exceeds the luminance reference.

It should be noted that the modifications performed at step 512 do not affect the spatial characteristics of the objects in the affected frames. That is, in the present disclosure objects may not be moved or adapted to new spatial 2D or 3D coordinates. This is contrast to prior art systems that perform interpolation or extrapolation between unaffected and affected frames. When mathematical interpolation or extrapolation is performed on pixels of affected frames with the pixels of unaffected frames, and the objects of the affected and unaffected frames have differing spatial coordinates, the modified frames will have new spatial coordinates which distort the spatial coordinates of the objects in the original affected frames. The present disclosure does not require spatial interpolation or extrapolation. Consequently, the objects modified at step 512 retain their original spatial characteristics without 2D or 3D spatial distortion. By avoiding 2D or 3D spatial distortion, the updated frames are substantially the same as before with the exception of improved chrominance.

At step 514, the STB 106 can be adapted to also modify the luminance of the objects in the affected frames using the luminance reference of step 504 also without spatial alteration. In this step, the luminance reference can be a calibration measure applied throughout the video content, or a luminance reference determined between affected and unaffected frames. The application of step 514 may result in a smoother transition between unaffected frames and the frames updated by steps 512 and 514 since there's consistency in both chrominance and luminance between frames. If resources of the STB 106 are scarce or suboptimal for real-time processing, or a user desires for the speed of processing the video content to be increased, the STB 106 can be adapted to skip step 514 and simply adapt chrominance of the affected frames.

Once the objects in the affected frames have been modified according to step 512 (and step 514, if desirable), the STB 106 can proceed to step 516 where the STB 106 replaces the affected frames with the frames modified for chrominance and luminance. As these frames are replaced in a video buffer of the STB 106, the STB 106 can proceed to step 518 and present the updated video content.

Upon reviewing the aforementioned embodiments of method 500, it would be evident to an artisan with ordinary skill in the art that said embodiments can be modified, reduced, or enhanced without departing from the scope and spirit of the claims described below. For example, method 500 can be applied to still images such as a photo album. It is common for photo albums to have similar pictures and/or a repetition of objects from different perspectives. Method 500 can be adapted to determine chrominance references and/or luminance references from similar photo images and adapt objects in the still pictures to remove distortions in chrominance and luminance caused by flash photography of the camera that recorded the still images as well as flash photography from other sources (e.g., multiple cameras capturing still images in a celebration).

Additionally, method 500 can be adapted to operate in any device that records images such as camcorders, smart phones with cameras, and so on. Method 500 can also be adapted as a post-processing application, or a nearly real-time application that reduces distortions caused by flash photography as images are captured by a recording device. In yet another embodiment, method 500 can be performed in whole or in part by infrastructure elements of the communication systems 100 such as server 130 or application servers 217 before the image content is delivered to a terminating device. It is also contemplated that portal 302 can provision the STB 106, server 130 or any other devices which can be adapted to operate according to method 500. In particular, the portal 302 can be used to establish preferences of users and/or a service provider of communication systems 100 and 200. Such preferences can identify when method 500 should or should not be applied to media content, the type of media content to which method 500 should be applied, setting preferred thresholds for luminance, chrominance, or combinations thereof, and so on.

It should be evident from the above illustrations, that other embodiments are contemplated by the present disclosure.

Figure 6:
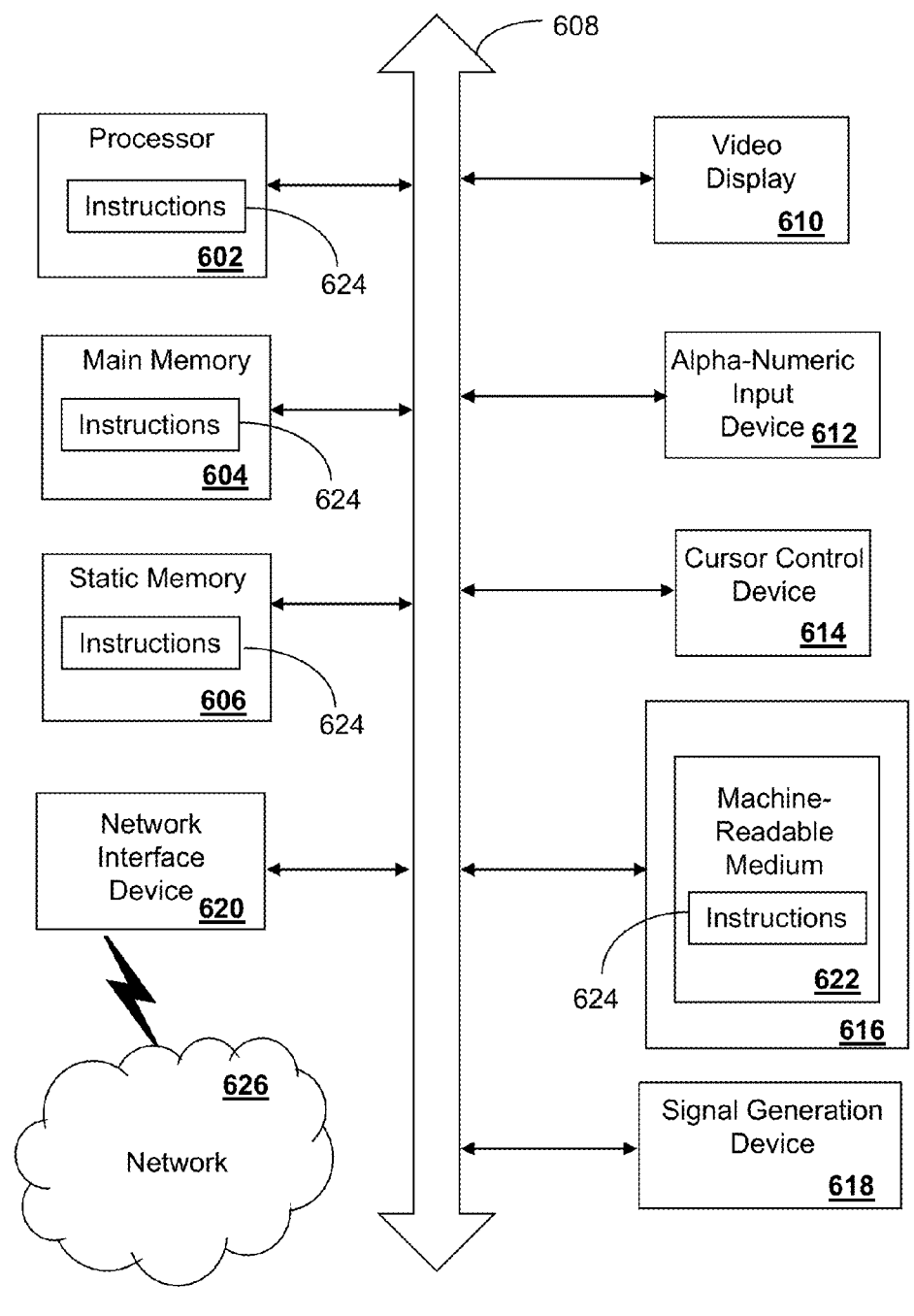
FIG. 6 is a diagrammatic representation of a machine in the form of a computer system within which a set of instructions, when executed, may cause the machine to perform any one or more of the methods discussed herein.

FIG. 6 depicts an exemplary diagrammatic representation of a machine in the form of a computer system 600 within which a set of instructions, when executed, may cause the machine to perform any one or more of the methods discussed above. One or more instances of the machine can operate, for example, as the server 130, STB 106, portable communication devices 116, application servers 217, and CDs 201, 202 and 203, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set-top box, comprising:
a memory to store instructions; and
a processor coupled to the memory, wherein responsive to executing the instructions, the processor performs operations comprising:
receiving video content from a multimedia source;
detecting a frame in the video content affected by a high intensity burst of light, wherein the affected frame has a luminance greater than a reference luminance;
determining a chrominance reference comprising a collection of respective measurements of chrominance of a plurality of objects in frames in the video content unaffected by the high intensity burst of light, wherein the unaffected frames each have a luminance less than the reference luminance;
modifying chrominance of objects in the affected frame according to the chrominance reference without altering spatial characteristics of the objects in the affected frame to produce a modified frame;
replacing the affected frame with the modified frame to create updated video content; and
presenting the updated video content at a presentation device.

2. The set-top box of claim 1, wherein the operations further comprise measuring the luminance reference from the unaffected frames.

3. The set-top box of claim 2, wherein the operations further comprise modifying the luminance of the affected frame according to the luminance reference without altering spatial characteristics of objects in the affected frame.

4. The set-top box of claim 2, wherein the operations further comprise determining the luminance reference from a first frame before the affected frame and a second frame after the affected frame.

5. The set-top box of claim 2, wherein the operations further comprise detecting the affected frame according to the luminance of an object in the affected frame.

6. The set-top box of claim 1, wherein the operations further comprise determining the chrominance reference from a first frame before the affected frame and a second frame after the affected frame.

7. The set-top box of claim 1, wherein the multimedia source comprises an internet protocol television source, a cable television source, or a satellite television source; wherein the operations further comprise buffering the video content to enable the replacing, and wherein the determining of the chrominance reference includes accessing a database to obtain a sample chrominance reference for a detected object of the plurality of objects.

8. A non-transitory computer-readable storage medium, comprising executable instructions which, when executed by a processor, cause the processor to perform operations comprising:
- determining a chrominance reference comprising a collection of respective measurements of chrominance of a plurality of objects in frames in video content each having a luminance less than a reference luminance;
- detecting a distorted frame in the video content, wherein the distorted frame is distorted at least in part by a burst of light;
- modifying a chrominance of an object in the distorted frame according to the chrominance reference without altering spatial characteristics of objects in the distorted frame to produce a modified frame; and
- presenting updated video content at a presentation device, wherein the updated video content has the modified frame.

9. The non-transitory storage medium of claim 8, wherein the operations further comprise determining the chrominance reference from objects in the frames in the video content.

10. The non-transitory computer-readable storage medium of claim 8, wherein the operations further comprise replacing the distorted frame with the modified frame to create the updated video content.

11. The non-transitory computer-readable storage medium of claim 8, wherein the video content is received from a broadcast media source or a video recording device.

12. The non-transitory computer-readable storage medium of claim 8, wherein the operations further comprise measuring the luminance reference from frames in the video content substantially unaffected by the burst of light.

13. The non-transitory computer-readable storage medium of claim 12, wherein the operations further comprise modifying a luminance in the distorted frame according to the luminance reference without altering spatial characteristics of objects in the distorted frame.

14. The non-transitory computer-readable storage medium of claim 12, wherein the operations further comprise determining the luminance reference from a first frame before the distorted frame and a second frame after the distorted frame.

15. The non-transitory computer-readable storage medium of claim 8, wherein the operations further comprise determining the chrominance reference from a first frame before the distorted frame and from a second frame after the distorted frame.

16. A method, comprising:
- determining, by a set-top box comprising a processor, a chrominance reference comprising a collection of respective measurements of chrominance of a plurality of objects in image frames in visual content each having a luminance less than a reference luminance;
- detecting, by the set-top box, an image frame in the visual content affected at least in part by a burst of luminance, wherein the affected image frame has a luminance greater than a reference luminance;
- modifying, by the set-top box, chrominance of objects in the affected image frame according to the chrominance reference and without altering spatial characteristics of the objects in the affected image frame to produce a modified image frame; and
- presenting, by the set-top box, updated visual content at a presentation device having the modified image frame.

17. The method of claim 16, wherein the visual content comprises video content or still image content, and wherein the method further comprises determining, by the set-top box, the chrominance reference from portions of objects in a frame substantially unaffected by the burst of luminance.

18. The method of claim 16, comprising determining, by the set-top box, the chrominance reference from a first image frame before the affected image frame and a second image frame after the affected image frame.

19. The method of claim 16, comprising:
- measuring, by the set-top box, a luminance reference from image frames in the visual content substantially unaffected by the burst of luminance; and
- modifying a luminance of the affected image frame according to the luminance reference without altering spatial characteristics of objects in the affected image frame.

20. The method of claim 16, comprising:
- detecting, by the set-top box, a known object in a frame of the visual content; and
- determining the chrominance reference in part by searching for a known chrominance of the known object.

* * * * *